Feb. 17, 1953 — A. B. ELBON — 2,628,644
SHEAR CUT BAND SAW
Filed Sept. 27, 1950 — 2 SHEETS—SHEET 1

INVENTOR.
ARTHUR B. ELBON
BY
Patrick D. Beavers
ATTORNEY

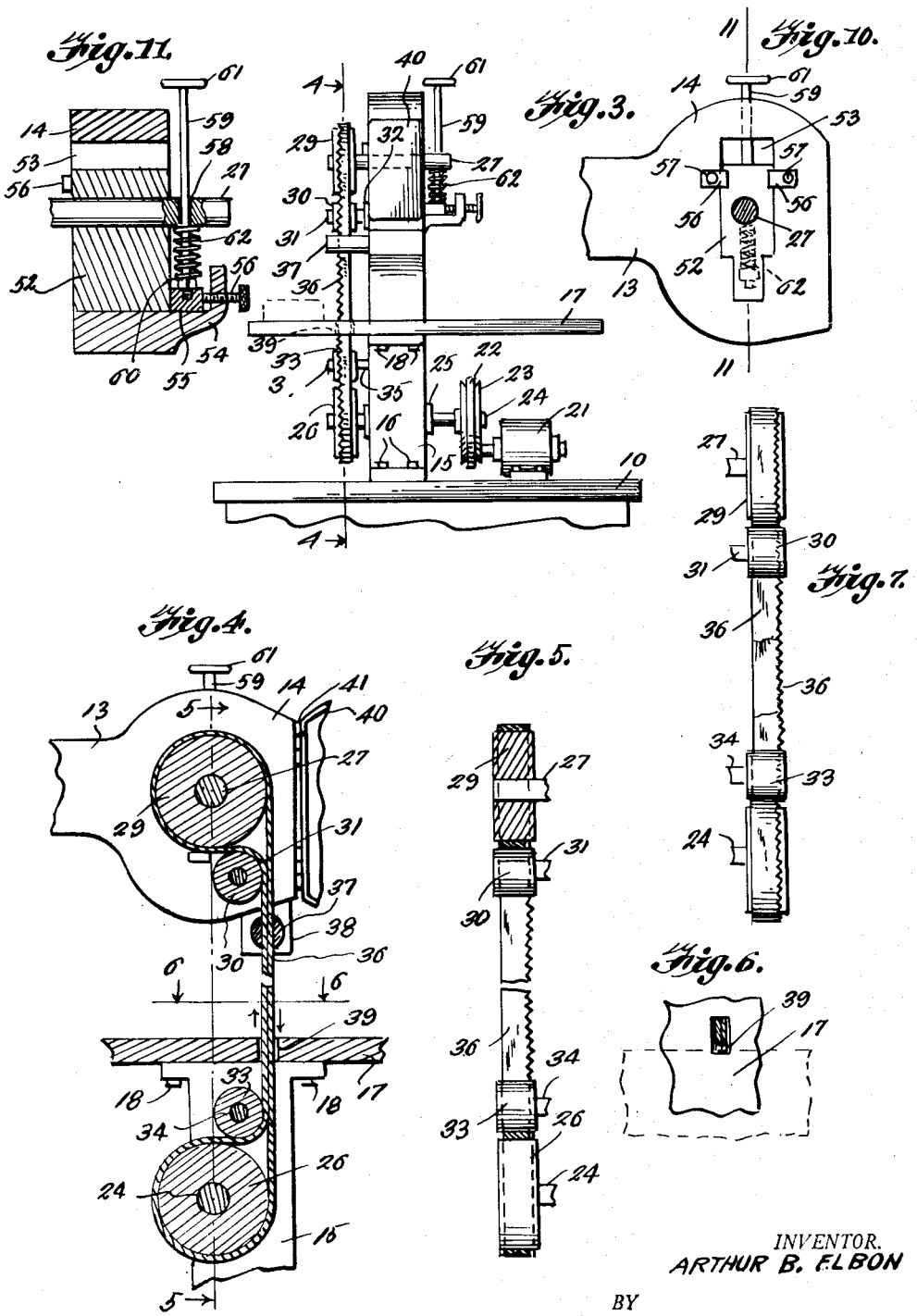

Patented Feb. 17, 1953

2,628,644

UNITED STATES PATENT OFFICE 2,628,644

SHEAR CUT BAND SAW

Arthur B. Elbon, St. Petersburg, Fla.

Application September 27, 1950, Serial No. 187,038

1 Claim. (Cl. 143—17)

The present invention relates to a shear cut band saw and it consists in the combinations, constructions and arrangements of parts herein described and claimed.

Generally there is provided a band saw whose teeth are entirely without any "set" and which saw is so arranged upon guide rollers in a general vertical direction that at the point of cutting both the downwardly moving and upwardly moving portions of the saw are in close alignment with each other and the principal object of the arrangement is to cut without brazing and rebrazing such as is the case with the conventional saw.

It is accordingly an object of the invention to provide a device of the character set forth which is simple in construction, relatively inexpensive to manufacture and yet effective and efficient in use.

Another object of the invention is the provision, in a device of the character set forth, of a band saw whose teeth are without "set."

A further object of the invention is the provision, in a device of the character set forth, of novel means for maintaining the cutting portions of an endless band saw in close alignment whereby, in the same cut, an upwardly and a downwardly moving blade are operating simultaneously.

Other and further objects of the invention will become apparent from a reading of the following specification taken in conjunction with the drawing, in which:

Figure 3 is an end elevational view of the device shown in Figures 1 and 2,

Figure 1:
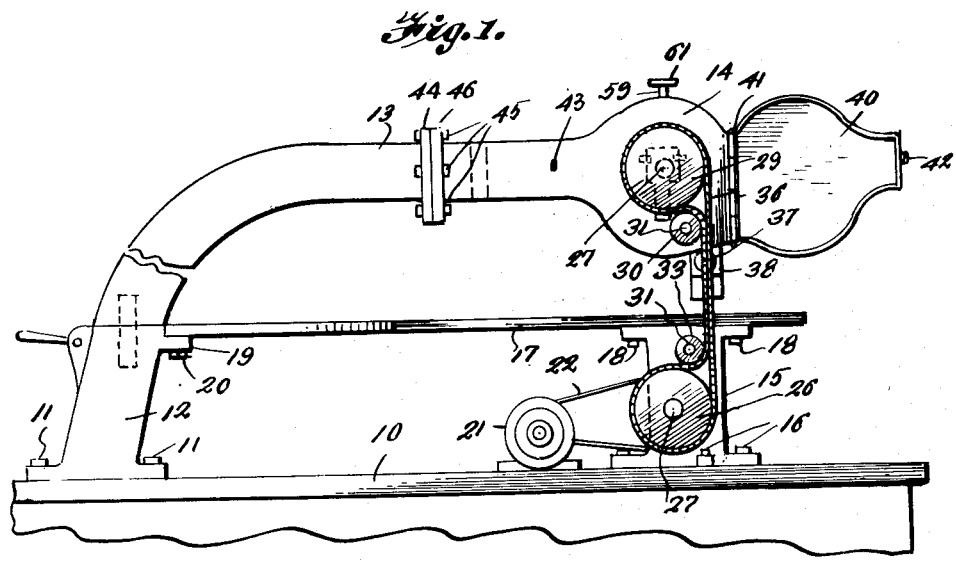
Figure 1 is a side elevational view of an embodiment of the invention.
Figure 2:
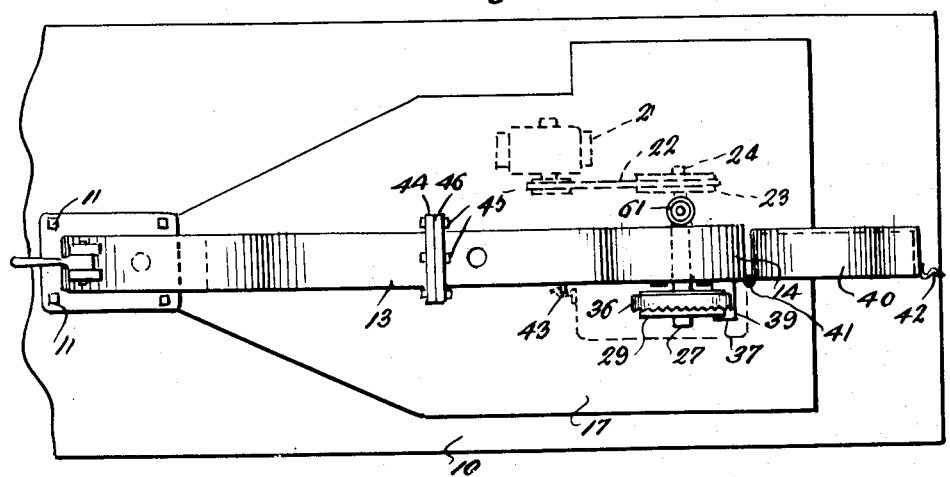
Figure 2 is a plan view thereof.
Figures 8, 9:
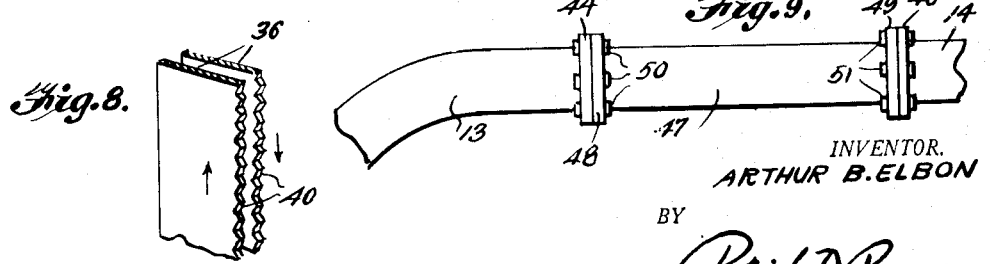

Figure 4 is an enlarged fragmentary sectional view taken along line 4—4 of Figure 3, Figure 5 is a fragmentary sectional view taken along line 5—5 of Figure 4, Figure 6 is a fragmentary sectional view taken along line 6—6 of Figure 4, Figure 7 is a fragmentary elevational view, partly broken away, further illustrating the manner of assembly of a band saw forming a part of the invention, Figure 8 is a fragmentary perspective view, partially exploded, further illustrating the manner of operation of the cutting portions of the saw forming a part of the invention, Figure 9 is a fragmentary side elevational view of an extension arm forming a part of the invention, Figure 10 is a fragmentary side elevational view, partly in section, illustrating a tensioning means forming a part of the invention, and Figure 11 is a sectional view taken along line 11—11 of Figure 10.

Referring more particularly to the drawings, there is shown therein an apparatus embodying the present invention and consisting of a base 10 having fastened thereto by bolts 11 or the like a standard 12 having integrally formed therewith a horizontally extending arm 13 terminating in a head 14.

A support member 15 is secured to the base 10 by means of bolts 16 or the like at its lower end and has mounted thereon a horizontally extending saw table 17 which is secured to the top thereof by means of bolts 18 or the like. The saw table 17 extends to the standard 12 and is affixed to the top of a bracket 19 formed on such standard and bolts 20 secure the saw platform 17 to the bracket 19.

An electric motor 21 is securely mounted upon the base 10 and is connected by means, preferably, of a V-belt 22 with a pulley 23 which is mounted upon a transversely extending shaft 24 journaled, as indicated at 25, in the support 15 and which extends through the support 15 and has mounted upon its other end a guide roller 26.

A shaft 27 is journaled, as indicated at 28, in the head 14 and extends transversely therethrough and has mounted thereon a guide roller 29 similar in size to the guide roller 26. An idler wheel 30 is affixed to a stub shaft 31 which is journaled, as indicated at 32, in the head 14 immediately below the roller 29 and an idler wheel 33 is carried by a shaft 34 journaled, as indicated at 35, in the support member 15 immediately above the guide roller 26.

A band saw 36 is entrained over the guide roller 29 and thence extends downwardly through the center of a guide arm 37 which extends transversely from a dependent portion 38 of the head 14, the guide member 37 being preferably formed of an extremely hard metal. The saw then extends downwardly and through a rectangular opening 39 in the saw platform 17 and is then entrained over the guide roller 26 and thence upwardly and beneath the idler wheel 33 thence upwardly through the opening 39 and the center of the guide member 37, thence over the idler wheel 30 and thence over the guide wheel 29 to the point of beginning.

A protective shield 40 is hinged, as indicated at 41 to one side of the outer portion of the head 14 and is provided with a latch 42 which is adapted to cooperate with a dog 43 affixed to the head 14.

The arm 13 is provided with a flange 44 which is connected by bolts 45 with a similar flange 46 forming a part of the head 14 and, in order to place the head 14 at a greater distance from the standard 12, an extension arm 47 having a flange 48 at one end and a flange 49 at its other end, is provided. The flanges 44 and 48 are connected by bolts 50 and the flanges 46 and 49 are connected by bolts 51 in such case.

A tensioning device is provided for maintaining the saw 36 in a taut condition. This is shown in detail in Figures 10 and 11 and consists of a block 52 which is vertically movable in a vertically extending passageway 53 formed in the head 14. The shaft 27 extends through this block 52. A bracket 54 extends outwardly from one side of the head 14 and has mounted thereon adjacent the block 52 a follow block 55. A tensioning screw extends inwardly and horizontally through the bracket 54 in which it is threadably engaged and abuts the follow block 55 at its inner end to thereby maintain the block 52 in proper aligned position in the passageway 53, a pair of retaining arms 56 being affixed to the head at the opposite side thereof and extending inwardly of the opening of the passageway 53 at that side. The arms 56 are affixed to the head 14 by screws 57 or the like.

A vertically extending opening 58 is provided in the shaft 27 above the follow block 55 and an elongated screw 59 extends vertically therethrough and is threadably connected at its lower end with the follow block 55.

A nut 60 is threaded upon the screw 59 adjacent its lower end and the screw 59 is provided with a handle 61 at its upper end. A compression spring 62 surrounds the screw 59 and bears against the nut 60 at its lower end and against the underside of the shaft 27 at its upper end.

It will be seen that when it is desired to tighten the saw 36 upon its pulleys, that it is only necessary to raise the nut 60 upon the screw 59 to thus compress the spring 62 which action, in turn, will act to raise the block 52 and hence the shaft 27.

In operation, it will be apparent that work to be cut by the saw may be placed flatly against the saw table 17 and fed toward the saw 36 and that it will meet the saw 36 where the upwardly and downwardly traveling portions of the same are held in close alignment by the arrangement of idler wheels and guide wheels and the guide member 37. It will also be evident that the teeth of the saw are of a V-shape, as clearly shown in Figure 8 of the drawings. It will also be seen that teeth 40 of the saw 36 are not provided with any "set" whatever and that hence there will be no interference between the closely aligned portions of the saw aforesaid. The idler wheels 30 and 33 and the guide wheels 26 and 29 are each formed of metal having no rubberized covering or the like such as is commonly the case in such mechanisms.

While but one form of the invention has been shown and described herein, it will be readily apparent to those skilled in the art that many minor modifications may be made without departing from the spirit of the invention or the scope of the appended claim.

What is claimed is:

An apparatus of the character described including a saw table having an opening therethrough, a head, a guide roller above said table, a guide roller below said table, an endless band saw entrained over said guide rollers and having its vertically extending portions in close alignment in those portions thereof above said table, and means for tensioning said saw upon said rollers and wheels, said means including a shaft for the upper guide roller, a support block vertically slidable in said head, said shaft extending through said support block, a bracket extending from one side of said head, a follow block abutting said support block and mounted upon said bracket, a set screw extending horizontally through said bracket and bearing against the outer side of said follow block, a screw extending through said shaft and threaded to said follow block, and a compression spring surrounding said screw between said follow block and said shaft.

ARTHUR B. ELBON.

REFERENCES CITED

The following references are of record in the file of this patent:

UNITED STATES PATENTS

| Number | Name | Date |
|---|---|---|
| 762,095 | Seymour | June 7, 1904 |
| 1,827,490 | Spencer | Oct. 13, 1931 |
| 2,415,877 | Hajek | Feb. 18, 1947 |
| 2,440,950 | Hill | May 4, 1948 |
| 2,476,573 | Whicher | July 19, 1949 |